Nov. 4, 1941.     I. A. STOLLER     2,261,529
HONEYCOMB CELL UNCAPPING DEVICE
Filed April 15, 1941     6 Sheets-Sheet 1
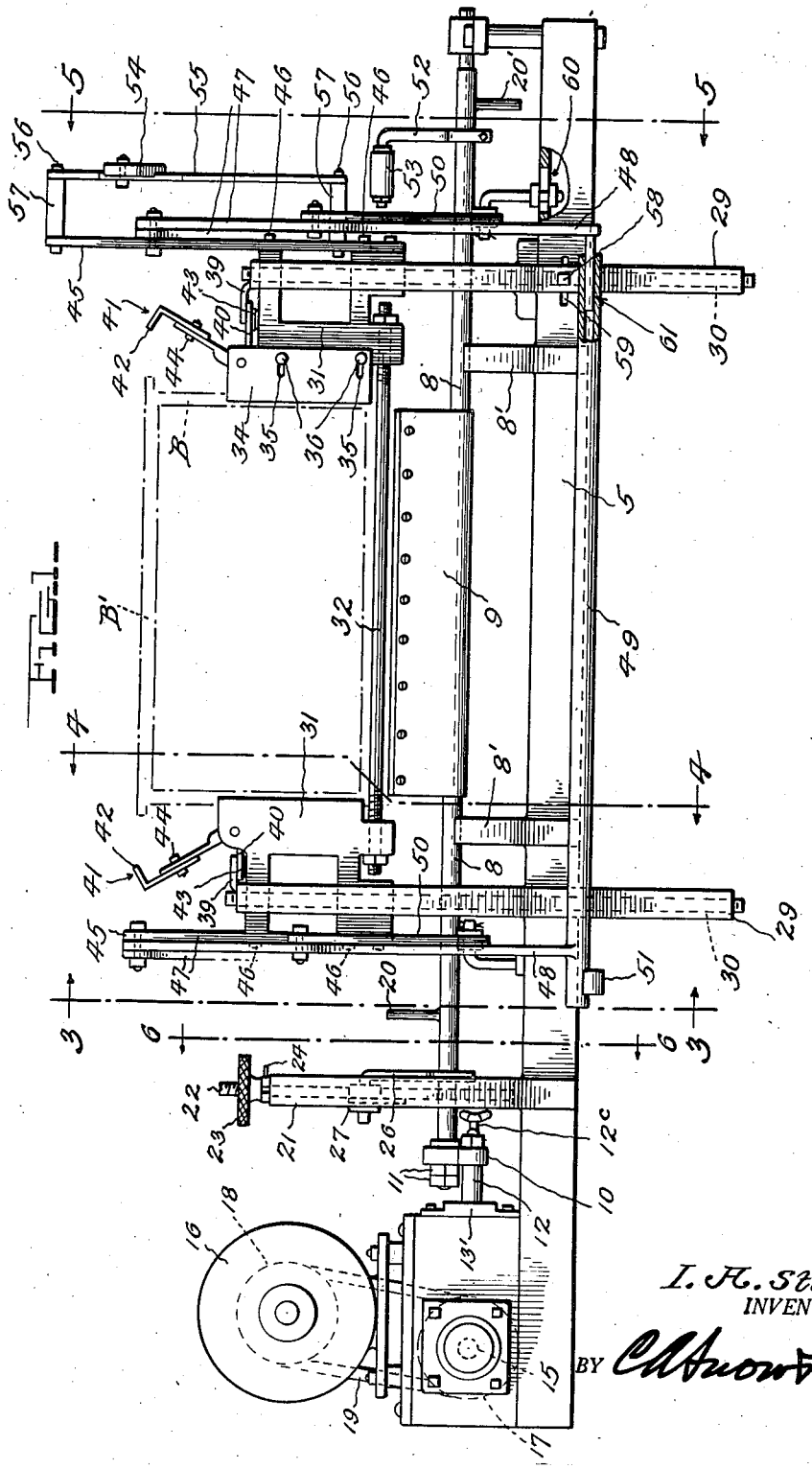
I. A. Stoller,
INVENTOR.
BY Knowles

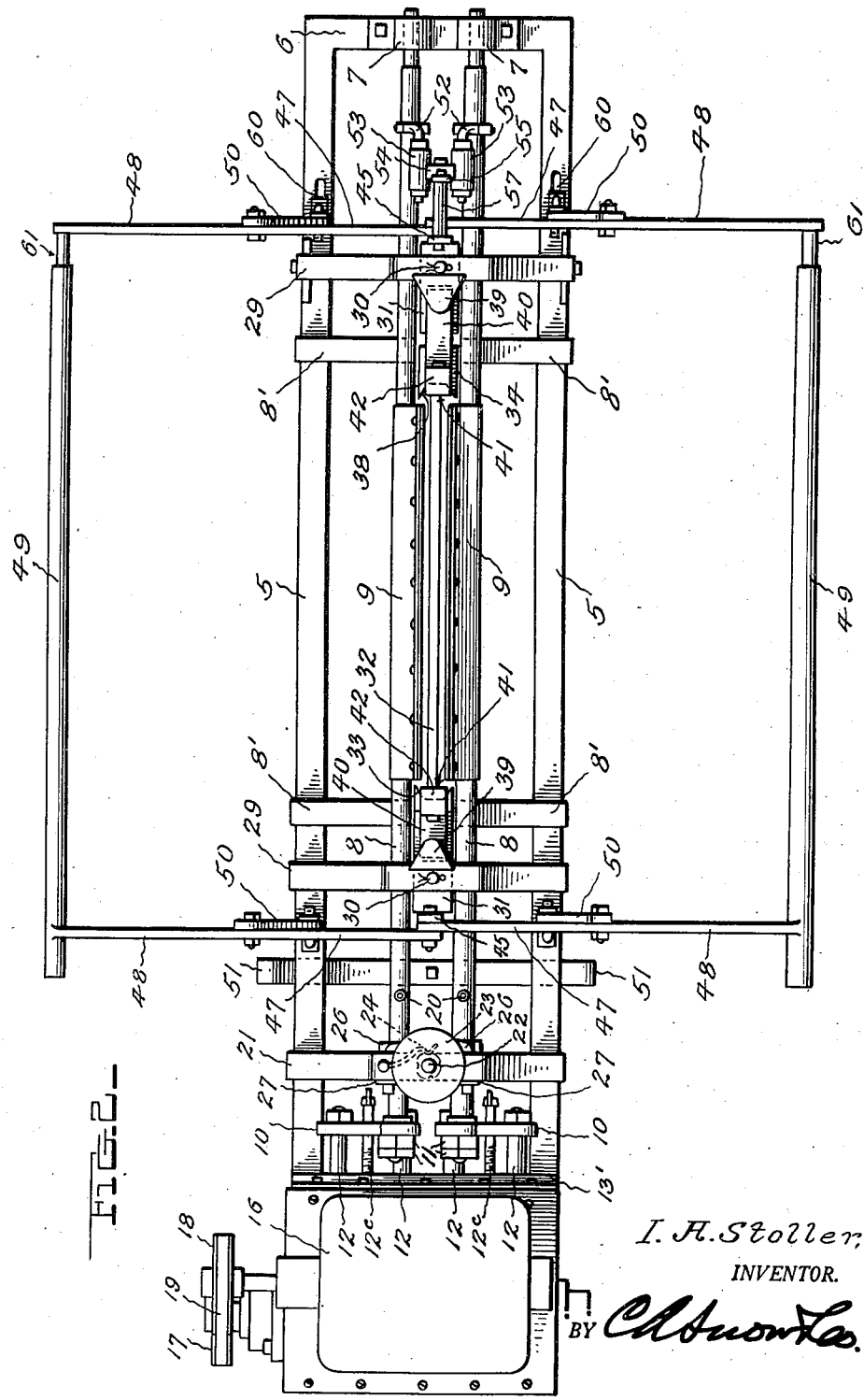

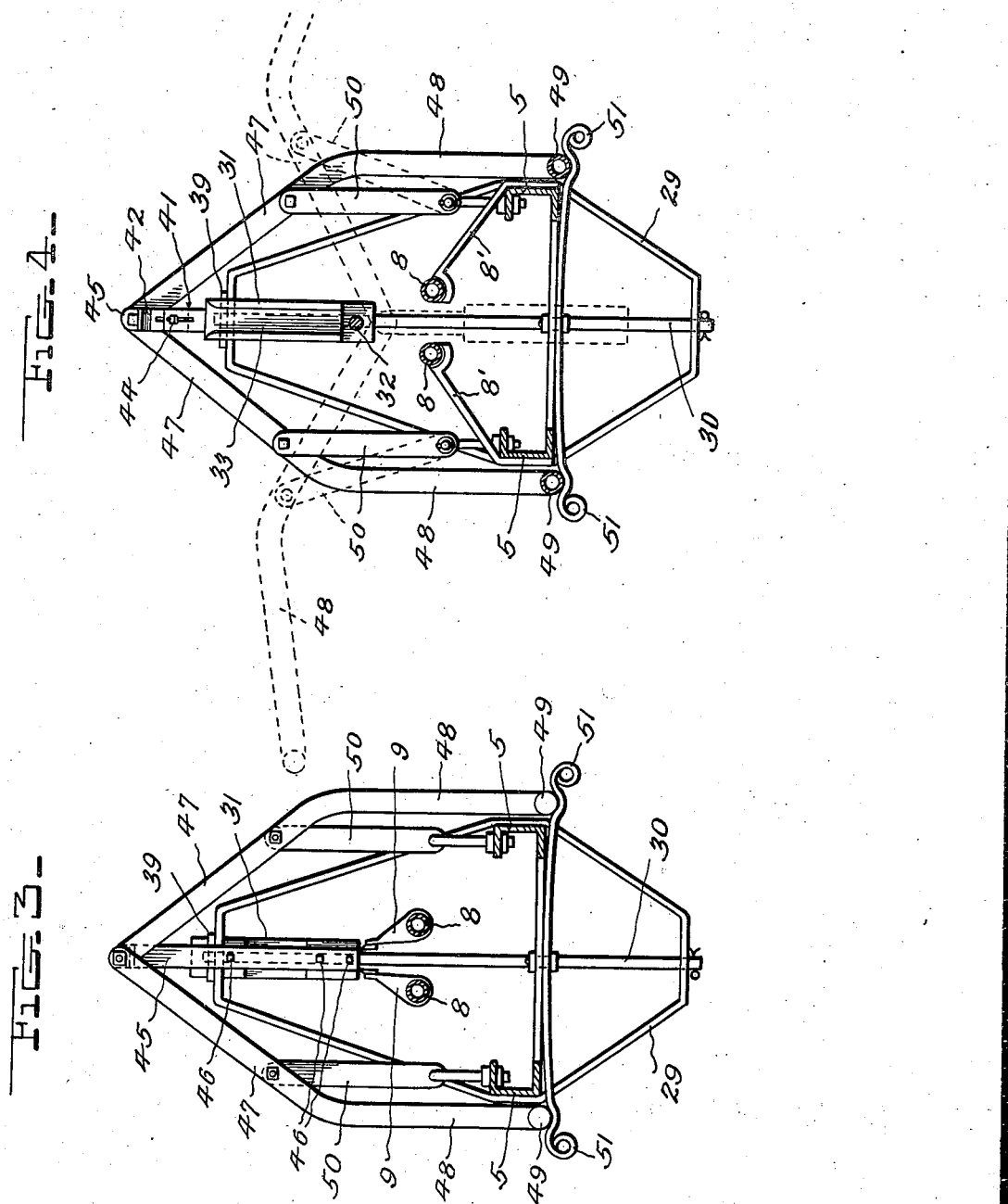

Nov. 4, 1941.   I. A. STOLLER   2,261,529
HONEYCOMB CELL UNCAPPING DEVICE
Filed April 15, 1941   6 Sheets-Sheet 4
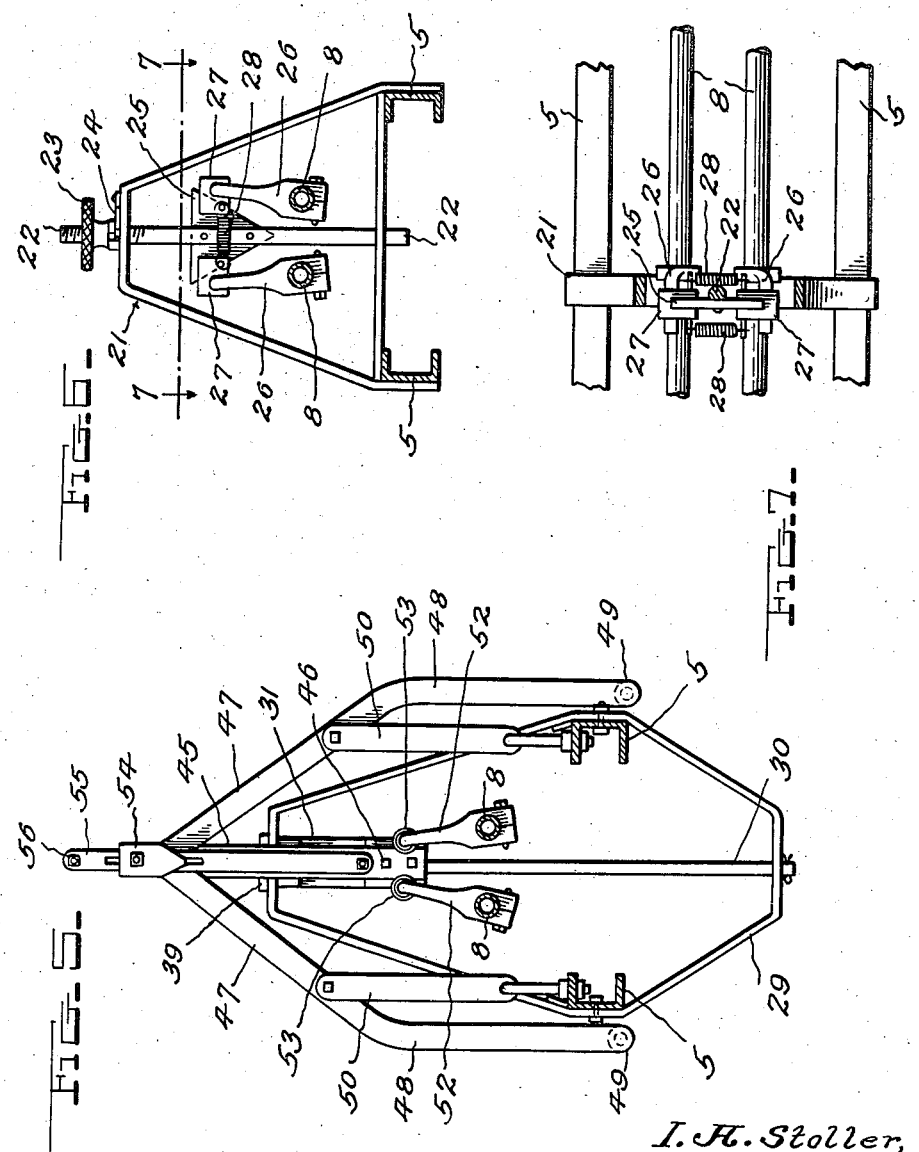
I. A. Stoller,
INVENTOR.
BY Nov. 4, 1941.  I. A. STOLLER  2,261,529
HONEYCOMB CELL UNCAPPING DEVICE
Filed April 15, 1941  6 Sheets-Sheet 5
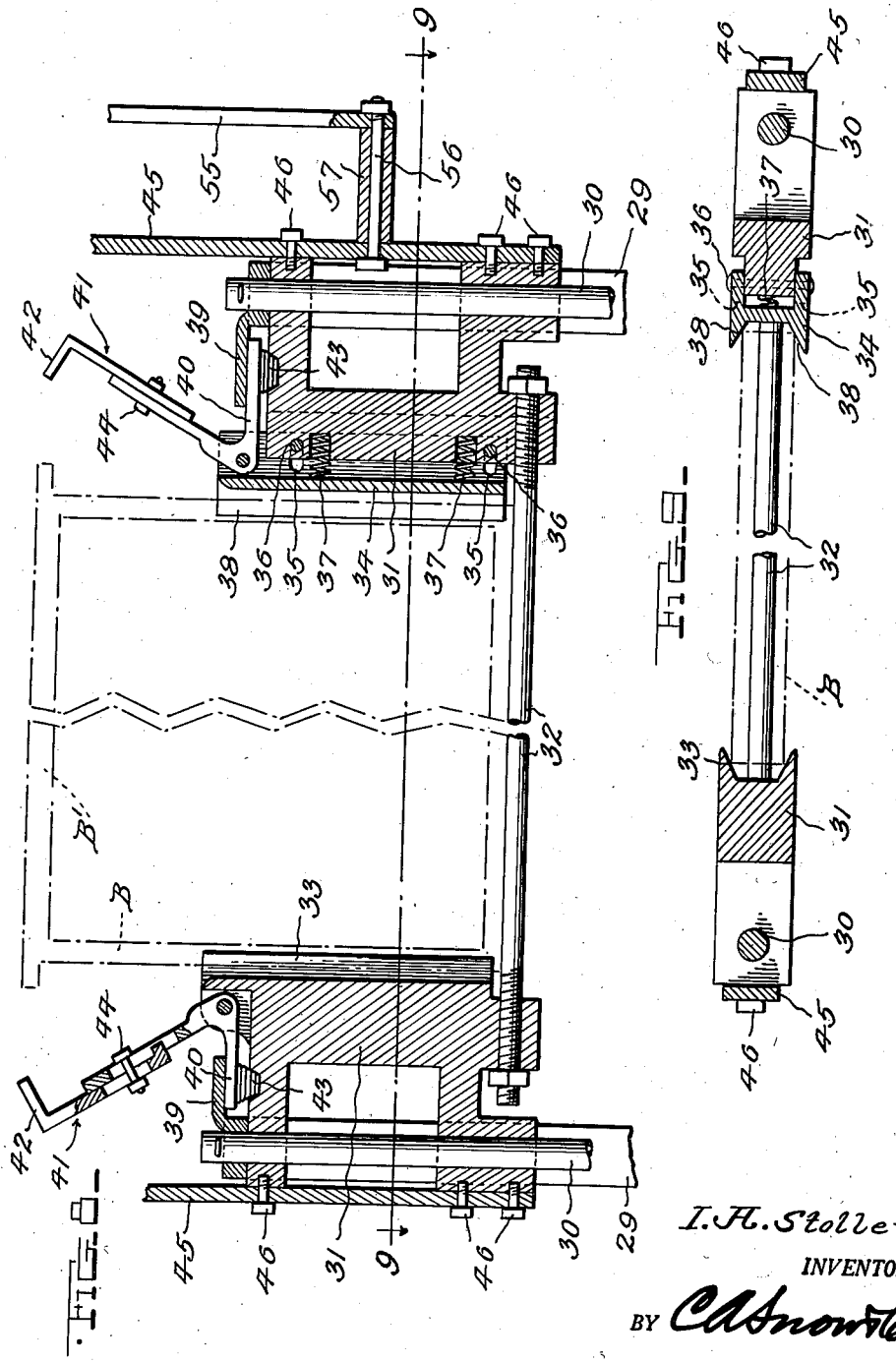
I. H. Stoller,
INVENTOR.
BY C. A. Knowles.

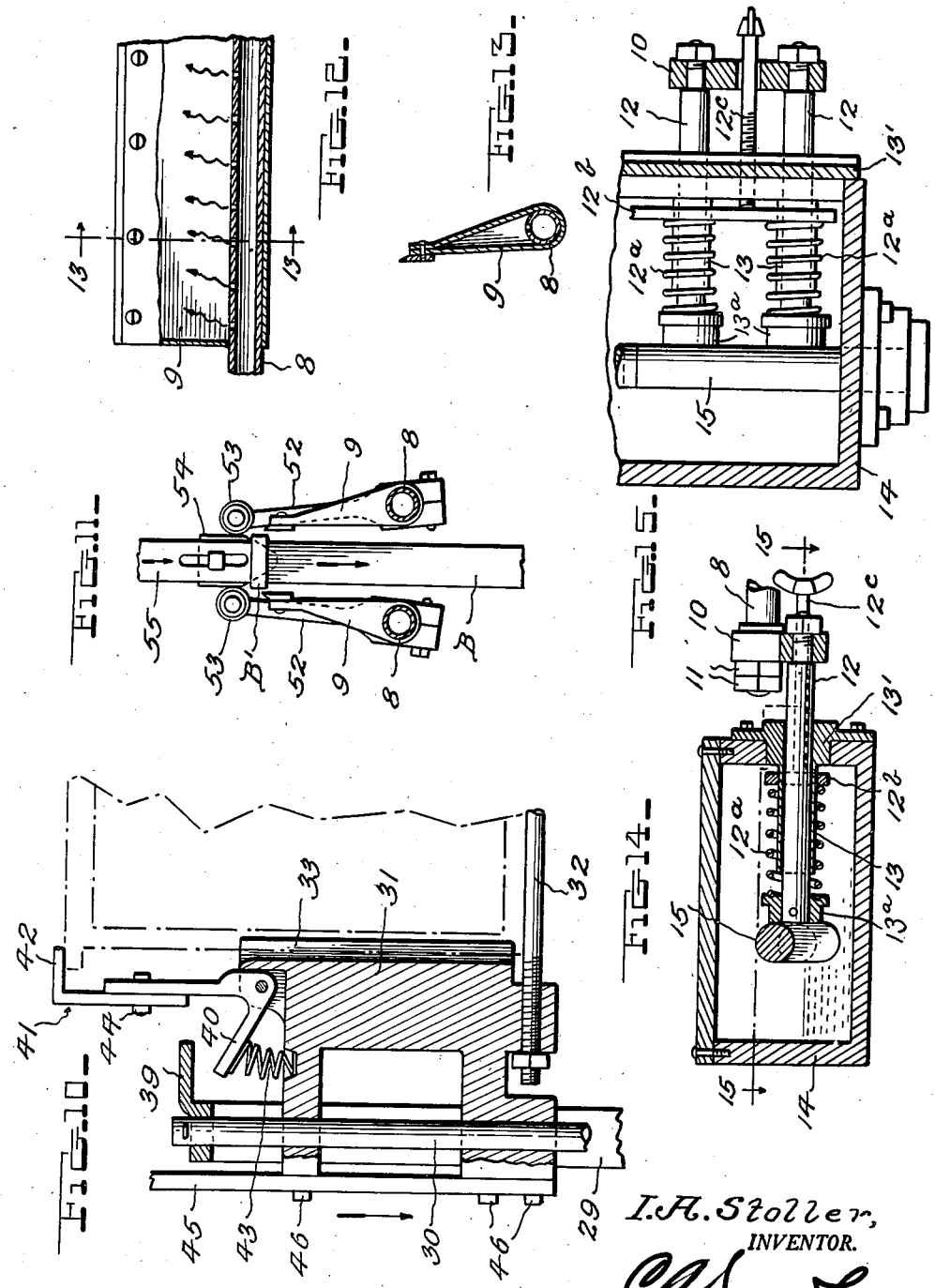

Patented Nov. 4, 1941

2,261,529

UNITED STATES PATENT OFFICE 2,261,529

HONEYCOMB CELL UNCAPPING DEVICE

Irvin A. Stoller, Latty, Ohio

Application April 15, 1941, Serial No. 388,672

9 Claims. (Cl. 6—12)

This invention relates to a machine designed for uncapping the cells of comb honey, preparatory to removing the honey therefrom.

An important object of the invention is to provide a device of this character embodying a pair of rapidly reciprocating heated knife blades between which the honeycombs are fed, the blades operating to remove the wax which caps the cells of the comb, whereby the honey may be extracted from the open cells, by the well known method now in common use.

Another object of the invention is to provide a movable carriage adapted to feed the combs to the blades of the machine, means being provided on the carriage for automatically locking the combs in the carriage as the carriage moves towards the knives.

A still further object of the invention is the provision of means for opening the blades, as the upper bar of the comb frame moves through the blades, the blades being held in such open position until the carriage moves downwardly a predetermined distance.

Still another object of the invention is the provision of means whereby the opening of the blades to permit the passage of the honeycomb therebetween, may be timed, adapting the device for use in uncapping the cells of honeycombs of various thicknesses.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is a front elevational view of a honeycomb cell uncapping machine, constructed in accordance with the invention.

Figure 2 is a plan view thereof, and illustrating the carriage-operating handles as in their open positions.

Figure 3 is a sectional view taken on line 3—3 of Figure 1.

Figure 4 is a sectional view taken on line 4—4 of Figure 1.

Figure 5 is a sectional view taken on line 5—5 of Figure 1.

Figure 6 is a sectional view taken on line 6—6 of Figure 1.

Figure 7 is a sectional view taken on line 7—7 of Figure 6.

Figure 8 is an enlarged vertical sectional view through the carriage, illustrating the comb-locking arms as in their open positions.

Figure 9 is a sectional view taken on line 9—9 of Figure 8.

Figure 10 is an enlarged sectional view illustrating the comb-locking arms as in their active positions, locking the comb within the carriage.

Figure 11 is a fragmental detail view illustrating the means for moving the blades outwardly to clear the comb bar at the initial movement of the carriage and frame.

Figure 12 is a fragmental sectional view illustrating the interior of one of the blades.

Figure 13 is a sectional view taken on line 13—13 of Figure 12.

Figure 14 is a sectional view through the gear housing of the machine.

Figure 15 is a sectional view taken on line 15—15 of Figure 14.

Referring to the drawings in detail, the frame of the machine comprises spaced parallel bars 5 connected at one of their respective ends by the bar 6. Bearings indicated at 7 are mounted at one end of the frame, and accommodate the parallel shafts 8 which are preferably hollow, and which support the blades 9 at points intermediate the ends thereof.

Inwardly inclined supporting bars 8' extend from the bars 5 and engage the shafts 8, holding the shafts against vibrating while in operation.

The opposite ends of the shafts 8 extend through plates 10 and are bolted thereto, as by means of the nuts 11, but permitted to rotate slightly.

Each of the plates 10 is connected with a pair of rods 12 that move through bearings 13 forming a part of the bar 13' fitted in a slot formed in one wall of the gear housing 14, the inner ends of the rods 12 being engaged by the cam shaft 15 operating within the gear housing, the cam shaft being operated by means of the motor 16 mounted at one end of the frame. Stops 13$^a$, are secured to the inner ends of the rods 12 and provide bearings against which the springs 12$^a$ engage, the opposite ends of the springs engaging the plate 12$^b$, that slides on the bearings 13. Adjusting screws 12$^c$, extend through the front wall of the gear housing 14 and engage said plate, to the end that the tension of the springs 12$^a$, may be regulated. The shaft 15 carries a pulley 17 at one end thereof, which pulley receives motion from the motor 16, through the pulley 18 and belt 19 operating over the pulleys 17 and 18. Pipes indicated at 20 extend upwardly from the hollow shaft 8, and communicate with the interior thereof. These pipes 20 afford means whereby flexible hose connections, may be made between the hollow shafts 8 and a suitable source of steam supply, so that the steam may find its way into the hollow blades 9, as shown by Figure 12 of the drawings, maintaining the blades hot or at a predetermined temperature to cause them to heat the wax of the comb under treatment, so that the caps may be readily cut therefrom. The steam outlet pipes are indicated at 20'.

Mounted on the frame, is a yoke 21 through which the threaded rod 22 extends, the upper end of the rod 22 being supplied with an adjusting nut 23 which, when rotated, moves the rod 22 vertically, for purposes to be hereinafter more fully described. A spring finger 24 cooperates with the adjusting nut 23 to hold the nut 23 in its positions of adjustment against vibrations of the machine.

Secured to the rod 22 is a triangular adjusting plate 25 which is so mounted that one of the corners of the plate extends downwardly so that inclined edges are provided at opposite sides of the plate. Secured to the hollow shafts 8, and rising therefrom, are arms 26 that carry blocks 27 at their upper ends, the blocks 27 being normally urged towards the inclined edges of the adjusting plate 25, by means of the coiled springs 28 which act to normally draw the blocks 27 towards each other. Since the arms 26 are secured to the hollow shafts 8, it will be obvious that by operating the adjusting nut 23, the initial positions of the blades 9, with respect to each other, may be regulated to meet various requirements. For example, if substantially wide honeycombs are to be treated with the machine, it would only be necessary to operate the adjusting nut 23 to feed the plate 25 downwardly, thus expanding the coiled spring and moving the arms 26 away from each other. The blades 9, moving with the hollow shafts, are thus set or spaced the proper distance apart to take care of the particular type of honeycomb.

Secured to the main frame of the machine, and disposed adjacent to the ends thereof, are frames 29 that support the honeycomb carriage, forming an important feature of the invention. Portions of these frames 29 extend below the bars 5, while portions thereof extend above the bars 5, as clearly shown by Figures 3 and 4 of the drawings. These frames 29 providing support for the vertical shafts 30 on which the vertically movable comb carriage operates.

The comb carriage comprises heads 31 formed with bearings to accommodate the shafts 30, so that the heads may move freely throughout the lengths of the shafts 30.

The heads 31 are held in spaced relation with each other, by means of the rod 32 which extends through openings in the lower ends of the heads 31, as shown by Figure 8 of the drawings. The inner face of one of the heads 31 is formed with a groove 33 having inclined side walls to engage the frame of the honeycomb positioned in the carriage. At the opposite side of the machine, the head is provided with a movable jaw 34 which is formed with parallel flanges that have elongated openings 35 for the reception of the bolts 36 that secure the movable jaw to the head. Coiled springs 37 are seated in recesses formed in the head carrying the movable jaw, the outer ends of the coiled springs resting against the inner surface of the movable jaw, urging the movable jaw outwardly towards the opposite head. The movable jaw is formed with a recessed forward edge, the walls thereof being inclined as at 38. Thus it will be seen that when a honeycomb frame is positioned between the heads, it will be held in position by the pressure of the springs 37, and since the recesses in which the comb frame is positioned, have inclined walls, it will be seen that the frames will be firmly gripped by the inclined walls wedging against the comb frame.

Extending inwardly from the upper end of each of the frames 29, is an ear 39 which is disposed directly over the arm 40 of the comb frame-engaging clamp 41 associated therewith. These clamps 41 are pivotally mounted and supported by the heads, so that the upper right angled ends 42 of the clamps will extend over the upper edge of the honeycomb frame being moved towards the blades of the machine. Coiled spring 43 are positioned between the heads 31 and arms 40 to normally urge the upper ends of the arms inwardly towards the frame, as the carriage moves downwardly towards the blades.

In order that these clamps 41 may be adjusted to clamp honeycomb frames of various sizes, it will be seen that each clamp is made in sections connected by means of the bolts 44. The sections have elongated openings so that they may be extended or retracted to lengthen or shorten the clamps at the will of the operator.

Thus it will be seen that when the heads 31 swing downwardly, the arms 40 will move away from the ears 39, and the upper or free ends of the clamps, will extend inwardly and grip the honeycomb frame. Secured to the outer edges of the heads 31, are vertical bars 45 that are held in position by means of the bolts 46.

The upper ends of these vertical bars 45 have pivotal connection with the arms 47 that have downwardly extended portions 48 connected by means of the rods 49, the pivotal connection between the arms 47 and main frame of machine, being made through the links 50 with the result that when the rods 49 are swung upwardly, the upper ends of the arms 47 will move downwardly, to the end that the comb-supporting carriage is also moved downwardly towards the blades. After the comb under treatment has moved through the blades, the rods 49 are swung downwardly elevating the comb above the blades or to the position shown in dotted lines in Figure 1 of the drawings. As the rods 49 move inwardly towards the frame, they are gripped by the spring arms 51, that hold the rods 49 in their inactive positions.

As shown by Figure 2 of the drawings, the hollow shafts 8, are mounted within their bearings to rotate, as well as reciprocate. The rotary movement of the shafts however, is controlled by the coiled spring 28 which normally tends to rotate the shafts inwardly towards each other.

Secured to the shafts 8, near the outer ends thereof, are upwardly extended arms 52 that have inwardly extended ends on which the rollers 53 are mounted. These rollers operate in parallel spaced relation with each other and are adapted to be engaged by the plate 54 that is adjustably mounted on the bar 55 carried by one of the vertical bars 45, and held in spaced relation therewith, by means of the bolts 56 and spacers 57 mounted on the bolts.

The lower side edges of the plate 54 are tapered downwardly, providing cam surfaces to engage between the rollers 53, moving the arms 52 outwardly with the result that the blades are moved away from each other, at a time just prior to the movement of the upper bar of the honeycomb frame, between the knives. Thus it will be seen that the blades clear the upper bar of the honeycomb frame to insure against the sharp edges of the blades being dulled by contact with the frame of the honeycomb.

The length of the plate 54 is such that when the plate moves upwardly away from rollers 53, the uppermost bar 13' of the honeycomb frame B has cleared the blades, and the blades will automatically move towards each other into cutting relation with the honeycomb to shave off the caps of the various cells of the honeycomb leaving the cells open, so that the honey may be extracted therefrom.

Parallel flanges are formed on the edges of the plate 54 and extend over the side edges of the bar 55 to prevent twisting of the plate 54 on the bar 55.

It might be further stated that the frame 29 at one end of the machine, is mounted on the bars 5 for adjustment longitudinally of the bars 5. This adjustment is accomplished by means of the bolts 58 that operate in elongated openings 59 formed in the bars 5, as clearly shown by Figure 1.

Mountings of the links 50, and the levers 48 are also adjustable at at 60 and 61 respectively. All of these adjustments are made necessary by the adjustment of rod 32 to vary the distance between the heads 31 according to the width of the comb frames under treatment.

In the operation of the machine, the motor 16 is set in motion, causing the shafts 8 to reciprocate rapidly. A honeycomb frame carrying the honeycomb, is positioned between the jaws of the carriage, in a manner as shown in dotted lines in Figure 1 of the drawings. The rods 49, which form the handles of the carriage-operating means, are now swung upwardly, with the result that the carriage moves downwardly carrying the honeycomb between the rapidly reciprocating blades. As the carriage moves downwardly, and before the honeycomb moves to a position opposite to the cutting edges of the blades, the clamps swing inwardly over the upper edges of the honeycomb frame, securely locking the honeycomb frame within the carriage, holding the honeycomb frame against movement with respect to the carriage, under the action of the knife blades.

After the comb has passed between the blades, the handles are forced downwardly to the limits of their movements, and the carriage moves upwardly. As the carriage reaches the limit of its upward movement, the clamps 41 swing away from the honeycomb frame and assume positions as shown in Figure 1, whereupon the frame may be readily removed from the carriage, and placed in the usual centrifugal honey extracting machine.

What is claimed is:

1. A machine for uncapping the cells of honeycombs, comprising a frame, a pair of spaced horizontally reciprocating blades mounted on the frame, a vertically movable carriage mounted on the frame and embodying spaced jaws having vertical grooves, said grooves being formed with inclined side walls between which a honeycomb is gripped, said carriage adapted to move between the blades, and means for rapidly reciprocating the blades as the honeycomb moves therebetween.

2. A machine for uncapping the cells of honeycombs, comprising a frame, a pair of horizontally disposed reciprocating blades mounted within the frame, a carriage embodying spaced jaws, movable vertically between said blades, means for urging one of said jaws laterally towards the cooperating jaw in gripping a honeycomb positioned between the jaws, and means for rapidly reciprocating the blades, as the frame and honeycomb move downwardly into cutting relation with the blades.

3. A machine for uncapping the cells of honeycombs, comprising a frame, a pair of spaced horizontally disposed reciprocating blades mounted on the frame, a vertically movable carriage mounted on the frame and in which a honeycomb to be uncapped, is positioned, said frame adapted to move the comb between the blades in cutting relation therewith, pivoted clamping members carried by the carriage and adapted to move over the upper edge of a honeycomb frame positioned in the carriage, clamping the honeycomb frame within the carriage, and means for rapidly reciprocating the blades as the honeycomb moves therebetween.

4. A machine for uncapping the cells of honeycombs, comprising a frame, a pair of horizontally disposed reciprocating blades mounted within the frame and arranged in spaced relation with respect to each other, means for adjusting the blades regulating the space between the blades and adapting the device for use in connection with honeycombs of various thicknesses, a vertically movable carriage operating within the frame and within which a honeycomb to be uncapped is positioned, said carriage adapted to move the honeycomb through the space between the blades in cutting relation with the blades, and pivoted members mounted on the carriage and adapted to move over the upper edge of a honeycomb frame positioned within the carriage, clamping the honeycomb frame within the carriage.

5. A machine for uncapping the cells of honeycombs, comprising a frame, a pair of horizontally disposed reciprocating blades, mounted on the frame, said blades being arranged in parallel spaced relation with respect to each other, the cutting edges of the blades being disposed upwardly, a vertically reciprocating carriage, mounted on the frame, jaws forming a part of the carriage and between which a honeycomb frame is held, yieldable means connected with one of said jaws for moving said jaw into close engagement with the honeycomb frame mounted within the carriage, said carriage adapted to move the honeycomb supported therein, into cutting relation with the blades, and means for rapidly reciprocating the blades as the honeycomb moves therebetween, uncapping the cells of the comb.

6. A machine for uncapping the cells of honeycombs, comprising a frame, a pair of horizontally disposed reciprocating blades mounted on the frame, said blades having their cutting edges disposed upwardly, means for adjusting the blades towards and away from each other, a carriage movable within the frame and adapted to grip a honeycomb, said carriage adapted to move downwardly between the blades moving the honeycomb mounted therein into cutting relation with said blades, and means operated by the movement of the carriage for spreading the blades apart whereby the blades clear the frame of the honeycomb moved therebetween, and means for rapidly reciprocating said blades.

7. A machine for uncapping the cells of honeycombs, comprising a frame, a pair of horizontally disposed reciprocating blades, mounted on the frame, means for adjusting the blades towards and away from each other varying the space between the blades, means for moving a honeycomb between the blades and in cutting relation with the blades, said means comprising a vertically movable carriage, and means operated by the carriage for spreading the blades apart at predetermined intervals.

8. A machine for uncapping the cells of honeycombs, comprising a frame, horizontally disposed spaced blades mounted within the frame and having their cutting edges disposed upwardly, a vertically movable carriage operating in the frame, said carriage adapted to receive a honeycomb and move the honeycomb between the blades in cutting relation therewith to uncap the cells of the honeycomb, pivoted members forming a part of the carriage and adapted to move over the upper edge of the frame of the honeycomb, securing the honeycomb within the carriage, and means for moving the pivoted members away from the honeycomb frame, releasing the honeycomb, when the carriage reaches the limit of its upward movement.

9. A machine for uncapping the cells of honeycombs, comprising a frame, a pair of reciprocating blades mounted within the frame and arranged in parallel spaced relation with respect to each other, the cutting edges of the blades being disposed upwardly, means for moving a honeycomb between the blades, said means comprising a vertically movable carriage mounted on the frame, said carriage having its upper side open to receive a honeycomb, pivoted arms mounted on the carriage, yieldable members adapted to normally urge the arms into gripping relation with the honeycomb mounted within the carriage, and ears on the frame adapted to be engaged by the arms as the carriage moves to the limit of its upward movement, for moving the arms away from the honeycomb supported in the carriage, releasing the carriage.

IRVIN A. STOLLER.